(12) United States Patent
Seo et al.

(10) Patent No.: US 9,277,435 B2
(45) Date of Patent: Mar. 1, 2016

(54) METHOD AND APPARATUS FOR TRANSMITTING CHANNEL STATE INFORMATION IN A WIRELESS COMMUNICATION SYSTEM

(75) Inventors: Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/241,834

(22) PCT Filed: Aug. 31, 2012

(86) PCT No.: PCT/KR2012/006989
§ 371 (c)(1),
(2), (4) Date: Feb. 27, 2014

(87) PCT Pub. No.: WO2013/032271
PCT Pub. Date: Mar. 7, 2013

(65) Prior Publication Data
US 2014/0227987 A1    Aug. 14, 2014

Related U.S. Application Data

(60) Provisional application No. 61/530,412, filed on Sep. 2, 2011, provisional application No. 61/596,132, filed on Feb. 7, 2012.

(51) Int. Cl.
*H03C 1/62*     (2006.01)
*H04B 17/00*    (2015.01)
(Continued)

(52) U.S. Cl.
CPC ............. *H04W 24/10* (2013.01); *H04B 7/0469* (2013.01); *H04L 1/0028* (2013.01);
(Continued)

(58) Field of Classification Search
CPC ..... H04W 24/10; H04W 52/52; H04W 52/42; H04B 17/0025; H04B 7/0669; H04B 7/0617; H04B 7/0634; H04B 7/0671; H04B 2001/0416; H03G 3/3042; H03G 3/3047
USPC ........... 455/101–104, 108, 110, 115.1–115.3, 455/118–120; 375/299
See application file for complete search history.

(56) References Cited

U.S. PATENT DOCUMENTS

2008/0049708 A1*  2/2008  Khan et al. .................... 370/343
2010/0035555 A1   2/2010  Bala et al.
(Continued)

FOREIGN PATENT DOCUMENTS

EP           2658115         10/2013
KR     10-2009-0039578       4/2009
(Continued)

OTHER PUBLICATIONS

NTT DoCoMo, "Views on Scalable CSI Feedback for DL CoMP in LTE-Advanced," 3GPP TSG RAN WG1 Meeting #58bis, R1-094243, Oct. 2009, 5 pages.
(Continued)

*Primary Examiner* — Nhan Le
(74) *Attorney, Agent, or Firm* — Lee, Hong, Degerman, Kang & Waimey

(57) ABSTRACT

The present invention relates to a wireless communication system. A method for a terminal to transmit channel state information to a plurality of transmission points in a wireless communication system comprises the steps of: receiving a configuration for reporting the channel state information; and selecting at least one subband for reporting the channel state information to each of a first transmission point and a second transmission point in accordance with the configuration for reporting the channel state information, wherein the configuration for reporting the channel state information comprises information on whether or not to select the subband for the first transmission point same to be the subband for the second transmission point.

13 Claims, 9 Drawing Sheets

(51) Int. Cl.
  *H04W 24/10* (2009.01)
  *H04L 1/00* (2006.01)
  *H04L 5/00* (2006.01)
  *H04B 7/04* (2006.01)
  *H04B 7/02* (2006.01)
  *H04B 7/06* (2006.01)

(52) U.S. Cl.
  CPC .............. *H04L 5/0057* (2013.01); *H04B 7/024* (2013.01); *H04B 7/063* (2013.01); *H04B 7/065* (2013.01); *H04B 7/0639* (2013.01); *H04L 5/0096* (2013.01)

(56) References Cited

U.S. PATENT DOCUMENTS

2011/0188393 A1    8/2011  Mallik et al.
2012/0113830 A1*   5/2012  Zhu et al. .................... 370/252

FOREIGN PATENT DOCUMENTS

| WO | 2010/105486 | 9/2010 |
| WO | 2011/041759 | 4/2011 |
| WO | 2011/055940 | 5/2011 |
| WO | 2011/094633 | 8/2011 |

OTHER PUBLICATIONS

PCT International Application No. PCT/KR2012/006989, Written Opinion of the International Searching Authority dated Feb. 19, 2013, 14 pages.
Korean Intellectual Property Office Application Serial No. 10-2014-7006850, Notice of Allowance dated Aug. 28, 2015, 2 pages.
European Patent Office Application Serial No. 12827059.2, Search Report dated Apr. 1, 2015, 7 pages.

* cited by examiner

FIG. 5
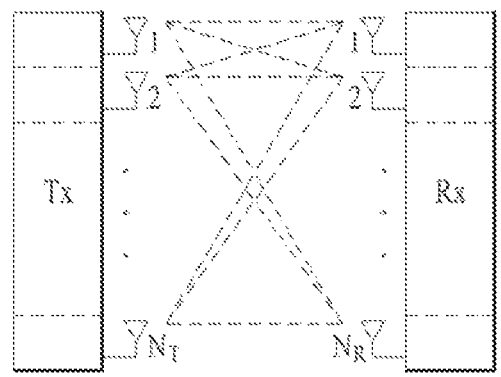
(a)
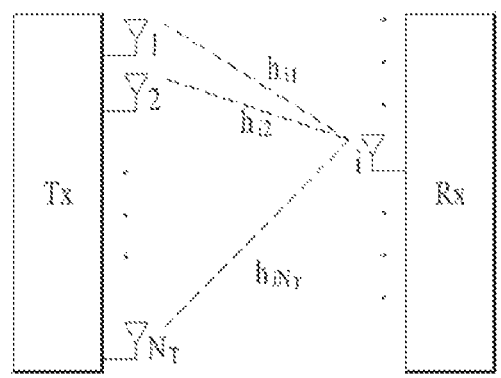
(b)

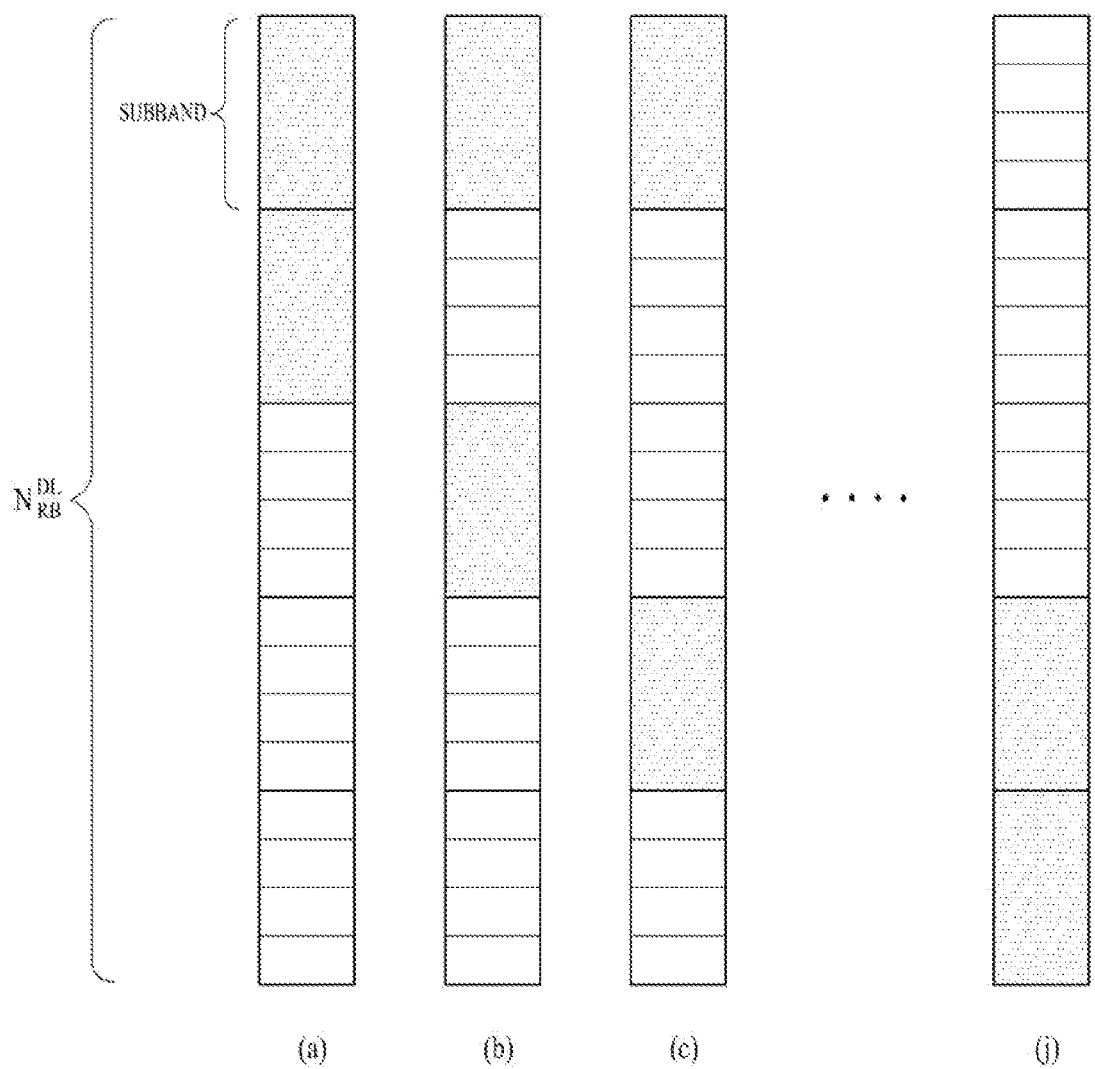

FIG. 8

| Channel from eNB1 | Subband 0 PMI/CQI for eNB 1 | Subband 1 No CSI for eNB 1 | Subband 2 PMI/CQI for eNB 1 | Subband 3 No CSI for eNB 1 | Subband 4 PMI/CQI for eNB 1 | Subband 5 No CSI for eNB 1 |
|---|---|---|---|---|---|---|
| Channel from eNB2 | Subband 0 PMI/CQI for eNB 2 | Subband 1 PMI/CQI for eNB 2 | Subband 2 No CSI for eNB 2 | Subband 3 No CSI for eNB 2 | Subband 4 No CSI for eNB 2 | Subband 5 PMI/CQI for eNB 2 |

→ Frequency (a)

| Channel from eNB1 | Subband 0 PMI/CQI for eNB 1 | Subband 1 No CSI for eNB 1 | Subband 2 PMI/CQI for eNB 1 | Subband 3 No CSI for eNB 1 | Subband 4 No CSI for eNB 1 | Subband 5 PMI/CQI for eNB 1 |
|---|---|---|---|---|---|---|
| Channel from eNB2 | Subband 0 PMI/CQI for eNB 2 | Subband 1 No CSI for eNB 2 | Subband 2 PMI/CQI for eNB 2 | Subband 3 No CSI for eNB 2 | Subband 4 No CSI for eNB 2 | Subband 5 PMI/CQI for eNB 2 |

→ Frequency (b)

METHOD AND APPARATUS FOR TRANSMITTING CHANNEL STATE INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2012/006989, filed on Aug. 31, 2012, which claims the benefit of U.S. Provisional Application Nos. 61/530,412, filed on Sep. 2, 2011, and 61/596,132, filed on Feb. 7, 2012, the contents of which are all hereby incorporated by reference herein in their entirety.

TECHNICAL FIELD

The present invention relates to a wireless communication system and, more particularly, to a method and apparatus for transmitting/receiving channel state information.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, and a multi-carrier frequency division multiple access (MC-FDMA) system.

DISCLOSURE

Technical Problem

An object of the present invention is to provide a method for selecting subbands for each transmission point for transmission of frequency selective channel state information and transmitting the channel state information.

The technical objects that can be achieved through the present invention are not limited to what has been particularly described hereinabove and other technical objects not described herein will be more clearly understood by persons skilled in the art from the following detailed description.

Technical Solution

In a first technical aspect of the present invention, provided herein is a method for transmitting channel state information to a plurality of transmission points by a user equipment in a wireless communication system, including receiving a configuration for channel state information reporting; and selecting at least one subband to report channel state information for each of a first transmission point and a second transmission point according to the configuration for the channel state information reporting, wherein the configuration for the channel state information reporting includes information as to whether a subband for the first transmission point is to be identically selected with a subband for the second transmission point.

In a second aspect of the present invention, provided herein is a user equipment for transmitting channel state information to a plurality of transmission points in a wireless communication system, including a transmission module; and a processor, wherein the processor is configured to receive a configuration for channel state information reporting and select at least one subband to report channel state information for each of a first transmission point and a second transmission point according to the configuration for the channel state information reporting, and wherein the configuration for the channel state information reporting includes information as to whether a subband for the first transmission point is to be identically selected with a subband for the second transmission point.

The first and second technical aspects of the present invention may include the followings.

The user equipment may independently select subbands for each of the transmission points, except for the case in which the configuration for the channel state information reporting indicates that the subband for the first transmission point is to be identically selected with the subband for the second transmission point. The independently selected subbands may overlap.

The subband selected for the first transmission point may be excluded from selecting the subband for the second transmission point when the configuration for the channel state information reporting does not indicate that the subband for the first transmission point is to be identically selected with the subband for the second transmission point.

The method may further include reporting channel state information of the subband selected for the first transmission point and channel state information of the subband selected for the second transmission point.

Channel state information of the subband selected for the first transmission point and channel state information of the subband selected for the first transmission point may be transmitted in the same subframe.

The channel state information may include at least one of channel quality information, a precoding matrix index, and a rank indicator.

The configuration for the channel state information reporting may be received through radio resource control (RRC) signaling.

The configuration for the channel state information may be received through first layer (L1)/second layer (L2) control signaling.

The transmission points may be related to dynamic cell selection or joint transmission.

The subband may include a preset number of consecutive resource blocks in a system bandwidth.

The channel state information of the subband selected for each transmission point may be an average of channel quality information values for the selected subband.

The channel state information may be transmitted on at least one of a physical uplink control channel and physical uplink shared channel.

Advantageous Effects

According to the present invention, channel state information can be effectively transmitted in a coordinated multipoint communication environment.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 5 is a view illustrating the configuration of a MIMO wireless communication system.

FIG. 7 is a view explaining subband selection according to an embodiment of the present invention.

FIG. 8 is a view explaining subband selection according to another embodiment of the present invention.

BEST MODE

Figure 1:
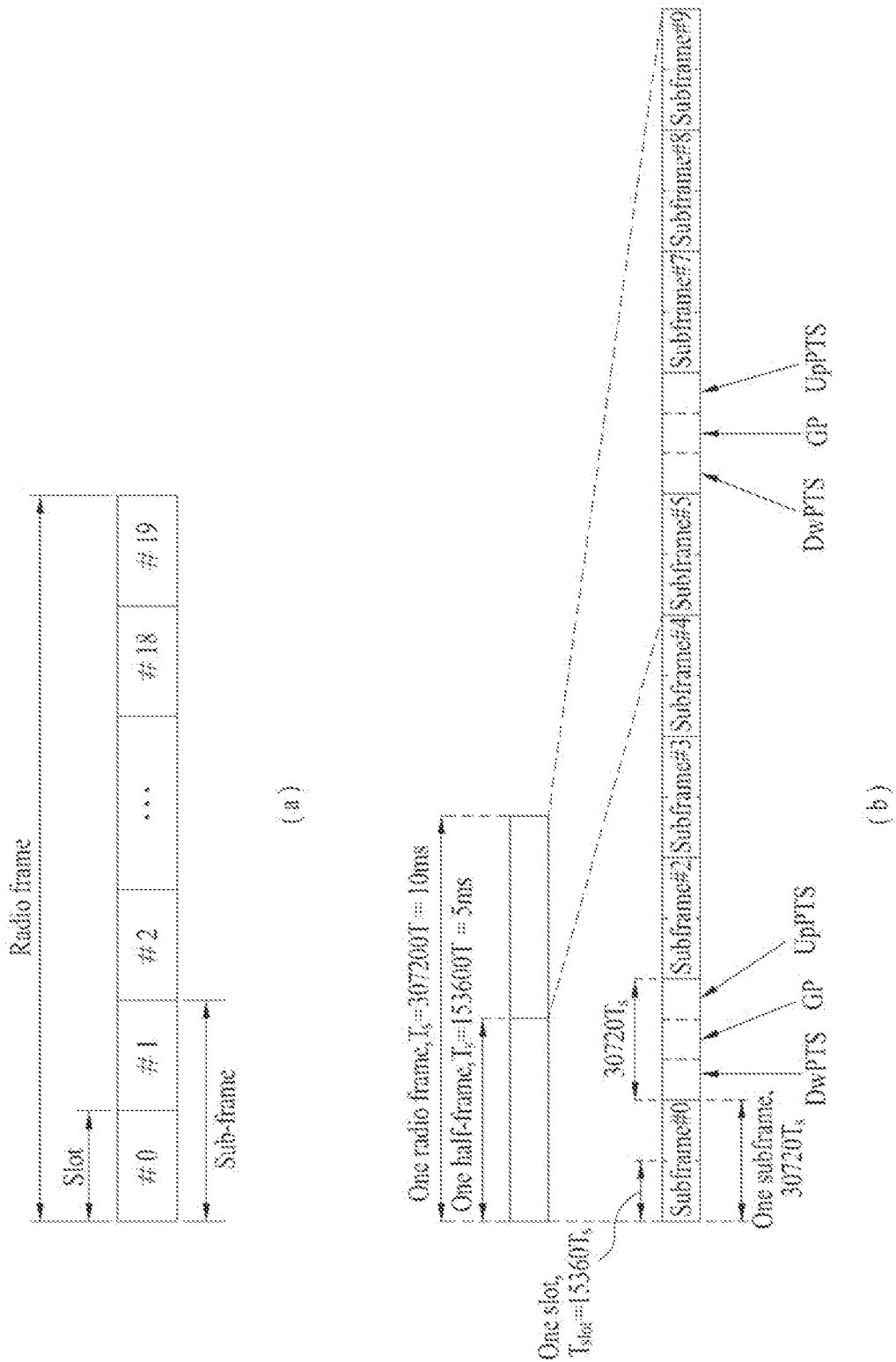
FIG. 1 is a view illustrating the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the present disclosure, the embodiments of the present invention are described based on a data transmission and reception relationship between a base station (BS) and a terminal. The BS is a terminal node of a network, which directly communicates with the terminal A specific operation described as performed by the BS may be performed by an upper node of the BS.

In other words, it is apparent that, in a network comprised of a plurality of network nodes including a BS, various operations performed for communication with a terminal may be performed by the BS, or network nodes other than the BS. The term BS may be replaced with the terms fixed station, Node B, evolved Node B (eNode B or eNB), access point (AP), transmission point, etc. The term relay is used interchangeably with relay node (RN), relay station (RS), etc. The term terminal may be replaced with the terms user equipment (UE), mobile station (MS), mobile subscriber station (MSS), subscriber station (SS), etc.

Specific terms used in the following description are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems such as institute of electrical and electronics engineers (IEEE) 802, $3^{rd}$ generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by a radio technology such as universal terrestrial radio access (UTRA) or CDMA2000. TDMA may be implemented by a radio technology such as global system for mobile communications (GSM)/general packet radio service (GPRS)/enhanced data rates for GSM evolution (EDGE). OFDMA may be implemented by a radio technology such as IEEE 802.11 (Wi-Fi), IEEE 802.16 (WiMAX), IEEE 802.20, evolved-UTRA (E-UTRA), etc. UTRA is a part of universal mobile telecommunication system (UMTS). 3GPP LTE is a part of evolved-UMTS (E-UMTS) using E-UTRA. 3GPP LTE employs OFDMA for downlink and SC-FDMA for uplink. LTE-A is an evolution of 3GPP LTE. WiMAX is described by the IEEE 802.16e specification (wireless metropolitan area network (WirelessMAN)-OFDMA reference system) and the IEEE 802.16m specification (WirelessMAN-OFDMA advanced system). For clarity, the present disclosure focuses on 3GPP LTE and LTE-A systems. However, the technical features of the present invention are not limited thereto.

The structure of a radio frame will now be described with reference to FIG. 1.

In a cellular orthogonal frequency division multiplexing (OFDM) wireless packet communication system, uplink (UL)/downlink (DL) data packets are transmitted in units of subframes. One subframe is defined as a predetermined time period including a plurality of OFDM symbols. 3GPP LTE supports the structure of a type 1 radio frame applicable to frequency division duplex (FDD) and the structure of a type 2 radio frame applicable to time division duplex (TDD).

FIG. 1(a) is a diagram illustrating the structure of the type 1 radio frame. A DL radio frame is divided into 10 subframes each including two slots in the time domain. A time during which one subframe is transmitted is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since the 3GPP LTE system uses OFDMA on DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when a UE moves fast, the extended CP may be used in order to further reduce inter-symbol interference.

In the case of the normal CP, since one slot includes 7 OFDM symbols, one subframe includes 14 OFDM symbols. The first two or three OFDM symbols of each subframe may be allocated to a physical downlink control channel (PDCCH) and the remaining OFDM symbols may be allocated to a physical downlink shared channel (PDSCH).

FIG. 1(b) illustrates the structure of the type 2 radio frame. The type 2 radio frame includes two half frames, each half frame including 5 subframes, a DL pilot time slot (DwPTS), a guard period (GP), and a UL pilot time slot (UpPTS). One subframe is divided into two slots. The DwPTS is used for initial cell search, synchronization, or channel estimation at a UE, and the UpPTS is used for channel estimation and UL transmission synchronization with a UE at an eNB. The GP is used to cancel UL interference between UL and DL, caused by the multi-path delay of a DL signal. One subframe includes two slots irrespective of the type of a radio frame.

The structures of radio frames are only exemplary. Accordingly, the number of subframes in a radio frame, the number of slots in a subframe, and the number of symbols in a slot may be changed in various manners.

Figure 2:
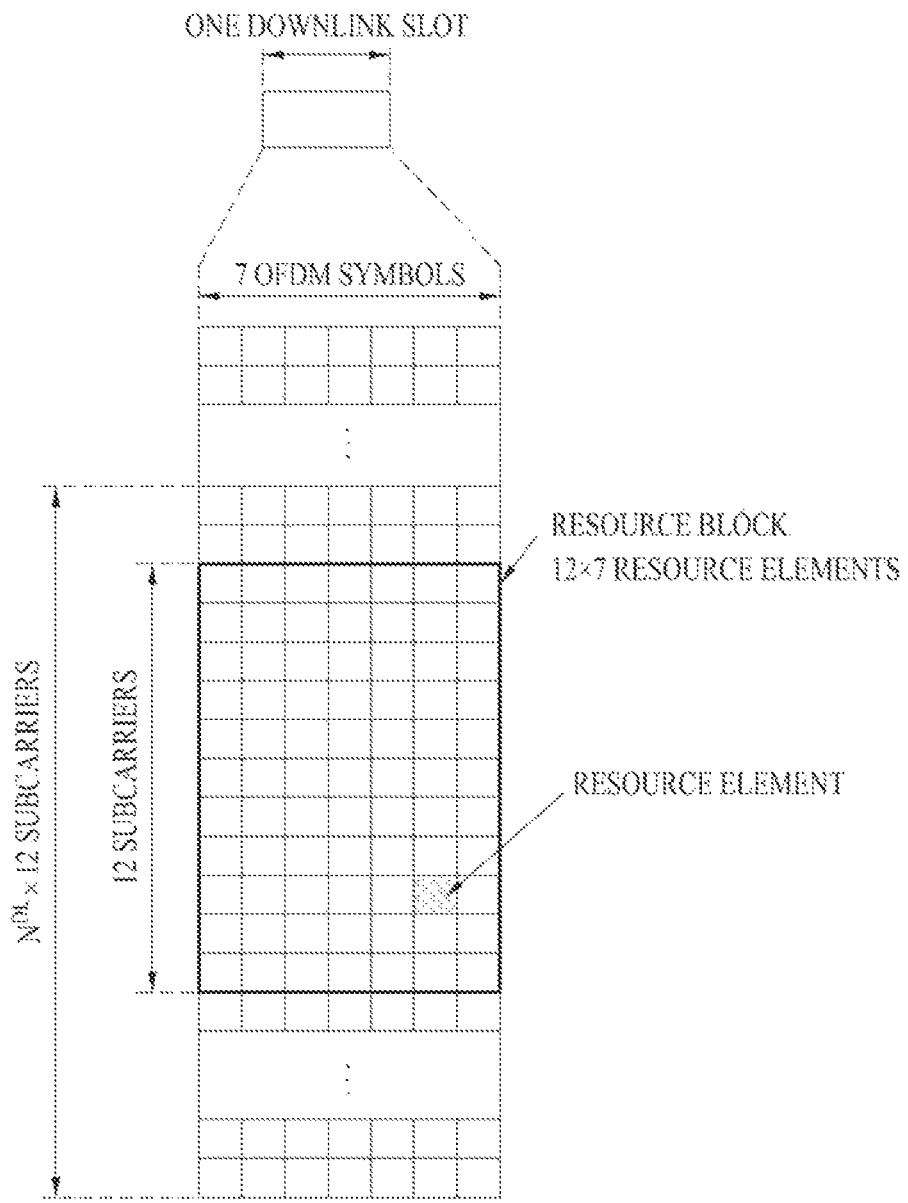
FIG. 2 is a view illustrating a resource grid in a downlink slot.

FIG. 2 illustrates a resource grid in a DL slot. A DL slot has 7 OFDM symbols in the time domain and an RB includes 12 subcarriers in the frequency domain, which does not limit the present invention. For example, a DL slot includes 7 OFDM symbols in a subframe with normal CPs, whereas a DL slot includes 6 OFDM symbols in a subframe with extended CPs. Each element of the resource grid is referred to as a resource element (RE). An RB includes 12×7 REs. The number of RBs in a DL slot, $N^{DL}$, depends on a DL transmission bandwidth. A UL slot may have the same structure as a DL slot.

Figure 3:
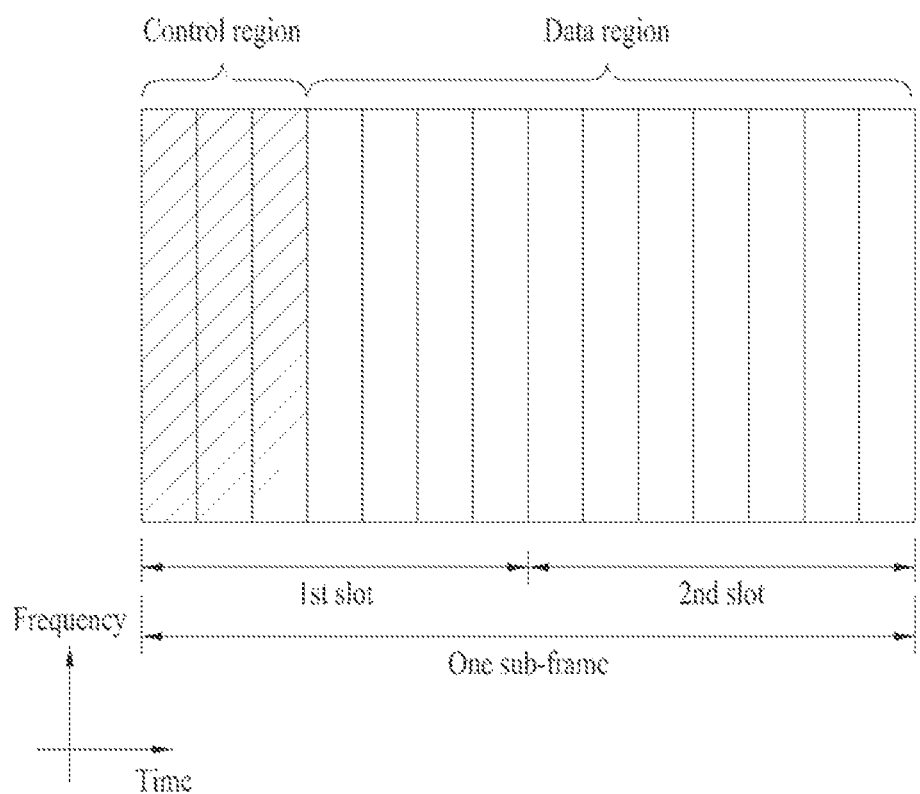
FIG. 3 is a view illustrating the structure of a downlink subframe.

FIG. 3 is a diagram illustrating the structure of a DL subframe. Up to three OFDM symbols at the start of the first slot of a DL subframe are used as a control region to which control channels are allocated and the other OFDM symbols of the DL subframe are used as a data region to which a PDSCH is allocated. DL control channels used in the 3GPP LTE system include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal as a response to a UL transmission. Control information carried on the PDCCH is called downlink control information (DCI). The DCI includes UL scheduling information, DL scheduling information, or UL transmit power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of resource element groups. The format of a PDCCH and the number of available bits for the PDCCH are determined according to the relationship between the number of CCEs and a coding rate provided by the CCEs. An eNB determines a PDCCH format according to DCI transmitted to a UE and adds a cyclic redundancy check (CRC) to control information. The CRC is masked by an Identifier (ID) known as a Radio Network Temporary Identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC thereof may be masked by a paging indicator identifier (P-RNTI). If the PDCCH carries system information (more particularly, a system information block (SIB)), the CRC thereof may be masked by a system information ID and a system information RNTI (SI-RNTI). To indicate that the PDCCH carries a random access response to a random access preamble transmitted by a UE, the CRC thereof may be masked by a random access-RNTI (RA-RNTI).

Figure 4:
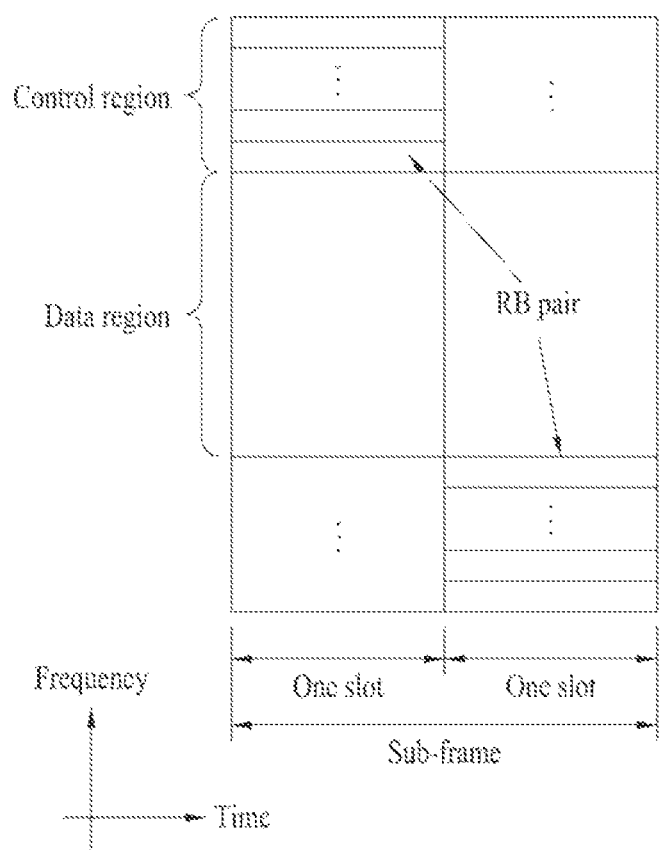
FIG. 4 is a view illustrating the structure of an uplink subframe.

FIG. 4 is a diagram illustrating the structure of a UL subframe. The UL subframe is divided into a control region and a data region in the frequency domain. A physical uplink control channel (PUCCH) including uplink control information (UCI) is allocated to the control region and a physical uplink shared channel (PUSCH) including user data is allocated to the data region. To maintain a single carrier property, a UE does not transmit a PUSCH and a PUCCH simultaneously. A PUCCH for one UE is allocated to an RB pair in a subframe. The RBs belonging to the RB pair occupy different subcarriers in two slots. Thus it is said that the RB pair allocated to the PUCCH is frequency-hopped over a slot boundary.

Modeling of MIMO System

FIG. 5 illustrates the configuration of a multiple input multiple output (MIMO) wireless communication system.

As illustrated in FIG. 5(a), when the number of transmit (Tx) antennas and the number of receive (Rx) antennas are increased to $N_T$ and $N_R$, respectively at both a transmitter and a receiver, a theoretical channel transmission capacity increases in proportion to the number of antennas, compared to the use of a plurality of antennas at either the transmitter or the receiver. Therefore, transmission rate and frequency efficiency are remarkably increased. Along with increased channel transmission capacity, the transmission rate may be increased in theory by the product of a maximum transmission rate $R_o$ when a single antenna is used and a rate increase rate $R_i$.

$$R_i = \min(N_T, N_R) \qquad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementation. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

A communication method in a MIMO system will now be described in more detail using mathematical model. It is assumed that the system includes $N_T$ Tx antennas and $N_R$ Rx antennas.

Regarding a transmission signal, a maximum of $N_T$ pieces of information can be transmitted through the $N_T$ Tx antennas, as expressed below.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by $$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Here, $w_{ij}$ denotes a weight between an i-th transmit antenna and a j-th piece of information. W is referred to as a precoding matrix.

Given $N_R$ receive antennas, signals received at the receive antennas, $y_1, y^2, \ldots y_{N_R}$, may be represented as the following vector.

$$y = [y_1, y_2, \ldots, y_{N_R}]^T \quad \text{[Equation 6]}$$

When channels are modeled in a MIMO wireless communication system, the channels may be distinguished according to the indexes of transmit and receive antennas. A channel passing through an i-th receive antenna from a j-th transmit antenna is denoted by $h_{ij}$. Note that the index of a receive antenna precedes the index of a transmit antenna in $h_{ij}$.

Meanwhile, FIG. 5(b) is a view illustrating channels from $N_T$ transmit antennas to an i-th receive antenna. The channels may be collectively represented as a vector or a matrix. Referring to FIG. 5(b), the channels from the $N_T$ transmit antennas to the i-th receive antenna may be expressed as follows.

$$h_i^T = [h_{i1}, h_{i2}, \ldots, h_{iN_T}] \quad \text{[Equation 7]}$$

Hence, all channels from the $N_T$ transmit antennas to the $N_R$ receive antennas may be expressed as the following matrix.

$$H = \begin{bmatrix} h_1^T \\ h_2^T \\ \vdots \\ h_i^T \\ \vdots \\ h_{N_a}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Actual channels experience additive white Gaussian noise (AWGN) after passing through the channel matrix H. AWGN $n_1, n_2, \ldots, n_{N_R}$ added to the $N_R$ receive antennas is given as the following vector.

$$n = [n_1, n_2, \ldots, n_{N_R}]^T \quad \text{[Equation 9]}$$

From the above mathematical model, the received signal may be expressed as follows.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The numbers of rows and columns in the channel matrix H representing channel states are determined according to the numbers of receive and transmit antennas. The number of rows in the channel matrix H is equal to the number of receive antennas, $N_R$, and the number of columns in the channel matrix H is equal to the number of transmit antennas, $N_T$. That is, the channel matrix H is an $N_R \times N_T$ matrix.

The rank of a matrix is defined as the smaller of the number of independent rows and the number of independent columns in the matrix. Accordingly, the rank of the matrix is not larger than the number of rows or columns of the matrix. The rank of the channel matrix H, rank(H), is restricted as follows.

$$\text{rank}(H) \leq \min(N_T, N_R) \qquad \text{[Equation 11]}$$

The rank of a matrix may also be defined as the number of non-zero Eigen values, when the matrix is decomposed by Eigen value decomposition. Similarly, the rank of a matrix may be defined as the number of non-zero singular values, when the matrix is decomposed by singular value decomposition. Therefore, the physical meaning of the rank of a channel matrix may be the maximum number of different pieces of information that can be transmitted on a given channel.

In MIMO transmission, the term "rank" is the number of paths through which signals are independently transmitted, and the term "number of layers" is the number of signal streams transmitted through respective paths at a specific time point and a specific frequency resource. In general, since a transmitter transmits as many layers as the rank of signal transmission, rank has the same meaning as the number of layers, unless otherwise noted.

Coordinated Multi-Point (CoMP)

According to enhanced system performance requirements of the 3 GPP LTE-A system, CoMP transmission and reception technology (also referred to as co-MIMO, collaborative MIMO, or network MIMO) has been proposed. CoMP can increase the performance of a UE located at a cell edge and increase average sector throughput.

Generally, the performance of a UE located at a cell edge and average sector throughput may be decreased due to inter-cell interference (ICI) in a multi-cellul environment with a frequency reuse factor of 1. To reduce ICI, the legacy LTE system has adopted a simple passive technique such as fractional frequency reuse (FFR) based on UE-specific power control so that a UE located at a cell edge may have appropriate throughput performance in an environment constrained by interference. However, it is desirable to reduce ICI or reuse ICI as a desired signal for the UE, rather than to decrease utilization of frequency resources per cell. For this purpose, a CoMP transmission technique may be adopted.

Downlink CoMP schemes are broadly classified into joint processing (JP) and coordinated scheduling/beamforming (CS/CB).

According to the JP scheme, data is available at each point (eNB) of CoMP cooperation units. The CoMP cooperation units refer to a set of eNBs used for a CoMP transmission scheme. The JP scheme is further divided into joint transmission (JT) and dynamic cell selection (DCS).

JT is a technique of transmitting PDSCHs from a plurality of points (partial or all points of the CoMP cooperation unit) at one time. That is, a plurality of transmission points may simultaneously transmit data to a single UE. The JT scheme can improve the quality of a received signal coherently or non-coherently and actively cancel interference with other UEs.

DCS is a technique of transmitting a PDSCH from one point (of CoMP cooperation units) at one time. That is, one point transmits data to a single UE at a specific time point, while the other points of the CoMP cooperation unit do not transmit data to the UE at the time point. A transmission point for transmitting data to the UE may be dynamically selected.

Meanwhile, in the CS/CB scheme, CoMP cooperation units may perform cooperative beamforming for data transmission to a single UE. While only a serving cell transmits data to the UE, user scheduling/beamforming may be determined through coordination among cells of the CoMP cooperation unit.

Uplink CoMP reception refers to reception of an uplink signal through cooperation among a plurality of geographically separated points. Uplink CoMP schemes include joint reception (JR) and coordinated scheduling/beamforming (CS/CB).

In JR, a plurality of reception points receives a signal transmitted through a PUSCH. In CS/CB, while only one point receives a PUSCH, user scheduling/beamforming is determined through coordination among cells of a CoMP cooperation unit.

In a CoMP system, multi-cell eNBs can commonly support data transmission for a UE. In addition, the eNBs simultaneously support one or more UEs using the same radio frequency resources, thereby increasing system performance. The eNBs may also perform space division multiple access (SDMA) based on CSI between the UE and the eNBs.

A serving eNB and one or more cooperative eNBs are connected to a scheduler through a backbone network in the CoMP system. The scheduler may receive feedback channel information about the channel states between each UE and cooperative eNBs, measured by the cooperative eNBs through the backbone network, and operate based on the channel information. For example, the scheduler may schedule information for cooperative MIMO for the serving eNB and the one or more cooperative eNBs. That is, the scheduler may directly command each eNB to perform a cooperative MIMO operation.

As described above, a CoMP system operates as a virtual MIMO system by grouping a plurality of cells into one group. Basically, the CoMP system adopts a MIMO communication scheme using multiple antennas.

Further, while the CoMP system has been described under the assumption of coordinated transmission between cells, the same principle may be applied to coordinated transmission between a plurality of transmission points (TPs) in one macro cell.

DL Channel State Information (CSI) Feedback

MIMO schemes may be classified into open-loop MIMO and closed-loop MIMO. In open-loop MIMO, a MIMO transmitter performs MIMO transmission without receiving CSI feedback from a MIMO receiver. In closed-loop MIMO, the MIMO transmitter receives CSI feedback from the MIMO receiver and performs MIMO transmission based on the CSI feedback. To achieve a multiplexing gain through MIMO Tx antennas, the transmitter and the receiver each may perform beamforming based on CSI in the closed-loop MIMO scheme. To enable the receiver (e.g. a UE) to feed back CSI, the transmitter (e.g. an eNB) may allocate a UL control channel or a UL-SCH to the receiver.

CSI feedback may include a rank indicator (RI), a precoding matrix index (PMI), and a channel quality indicator (CQI).

An RI is information about a channel rank. The channel rank is the maximum number of layers (or streams) that may carry different information in the same time-frequency resources. Because rank is determined mainly according to long-term fading of a channel, the RI may be fed back in a longer period than a PMI and a CQI.

A PMI is information about a precoding matrix used for transmission of a transmitter, reflecting the spatial characteristics of channels. Precoding refers to mapping transmission layers to Tx antennas. A layer-antenna mapping relationship may be determined according to a precoding matrix. The PMI is the index of an eNB precoding matrix preferred by the UE, selected based on a metric such as signal-to-interference-plus-noise ratio (SINR), etc. In order to reduce feedback overhead of precoding information, the transmitter and the receiver may share a codebook with a plurality of precoding matrices and the receiver may feed back only the index of a specific precoding matrix in the codebook.

A CQI is information representing a channel quality or a channel strength. The CQI may be expressed as a predetermined modulation coding scheme (MCS). That is, a feedback CQI index indicates a corresponding modulation scheme and coding rate. In general, the CQI reflects a reception SINR that can be achieved when an eNB configures spatial channels using a PMI.

A system supporting an extended antenna configuration (e.g. an LTE-A system) considers achieving additional multi-user diversity by use of MU-MIMO. Due to the existence of interference channels between UEs multiplexed in an antenna domain in MU-MIMO, it is necessary to avoid interference with other UEs, when an eNB transmits a DL signal to one of multiple UEs based on CSI feedback received from the one UE. Accordingly, more accurate CSI than in single user MIMO (SU-MIMO) should be fed back for reliable MU-MIMO operation.

For more accurate measurement and reporting of CSI, a new CSI feedback scheme may be adopted by modifying conventional CSI including an RI, a PMI, and a CQI. For example, precoding information fed back from the receiver may be indicated by a set of two PMIs. One of the two PMIs (PMI 1) has a long-term and/or wideband property, referred to as W1, whereas the other PMI (PMI 2) has a short-term and/or subband property, referred to as W2. A final PMI may be determined by combining W1 and W2 (or a function of W1 and W2). For example, let the final PMI be denoted by W. Then W=W1*W2 or W=W2*W1.

W1 reflects the average frequency and/or time characteristics of channels. In other words, W1 may be defined as CSI that reflects long-term channel characteristics in time, wideband channel characteristics in frequency, or both long-term channel characteristics in time and wideband channel characteristics in frequency. To represent these characteristics of W1, W1 will be referred to as long term-wideband CSI (or long term-wideband PMI).

Compared to W1, W2 reflects relatively instantaneous channel characteristics. In other words, W2 may be defined as CSI that reflects short-term channel characteristics in time, subband channel characteristics in frequency, or both short-term channel characteristics in time and subband channel characteristics in frequency. To represent these characteristics of W2, W2 will be referred to as short term-subband CSI (or a short term-subband PMI).

To determine a final precoding matrix W with two pieces of information having different characteristics representing channel states (e.g. W1 and W2), separate codebooks with precoding matrices representing channel information having different characteristics (e.g. a first codebook for W1 and a second codebook for W2) need to be configured. These codebooks may be referred to as hierarchical codebooks. Determination of a final codebook using hierarchical codebooks is called hierarchical codebook transformation.

For example, the long-term covariance matrix of channels expressed as Equation 12 may be used for hierarchical codebook transformation.

$$W = \text{norm}(W1\,W2) \quad \text{[Equation 12]}$$

In Equation 12, W1 (i.e. the long term-wideband PMI) is an element (i.e. a codeword) of a codebook (e.g. the first codebook) designed to reflect long term-wideband channel information. That is, W1 is a precoding matrix included in the first codebook reflecting long term-wideband channel information. On the other hand, W2 (i.e. the short term-subband PMI) is a codeword of a codebook (e.g. the second codebook) designed to reflect long term-wideband channel information. That is, W2 is a precoding matrix included in the second codebook reflecting short term-subband channel information. W is a codeword of a final codebook. norm(A) is a matrix obtained by normalizing the norm of each column of matrix A to 1.

W1 and W2 may have the structures expressed as Equation 13 by way of example.

$$W1(i) = \begin{bmatrix} X_i & 0 \\ 0 & X_i \end{bmatrix} \quad \text{[Equation 13]}$$

$$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r\ columns} \quad (\text{if rank} = r)$$

In Equation 13, W1 may be defined as a block diagonal matrix in which each block is an identical matrix $X_i$. One block $X_i$ may be defined as an $(N_t/2) \times M$ matrix where $N_t$ is the number of Tx antennas. $e_M^p$ of W2 (p=k, l, ..., m) is an M×1 vector where a pth element of the M vector elements is 1 and the other elements are 0. If $e_M^p$ is multiplied by W1, a pth column is selected from among the columns of W1. Thus this vector may be referred to as a selection vector. As the value of M increases, the number of feedback vectors transmitted at one time is increased to represent long term/wideband channels. Consequently, feedback accuracy is also increased. However, a larger M value leads to a decrease in the codebook size of W1 that is less frequently fed back, and an increase in the codebook size of W2 that is more frequently fed back. As a result, feedback overhead is increased. That is, feedback overhead and feedback accuracy are in a tradeoff relationship. Accordingly, the value of M may be determined such that feedback overhead is not too much, while feedback accuracy is maintained at an appropriate level. In W2, $\alpha_j$, $\beta_j$, and $\gamma_j$ represent predetermined phase values. In Equation 13, $1 \leq k, l$ and $m \leq M$ where k, l, and m are integers.

The codebook structures of Equation 13 are designed so as to reflect correlation characteristics between channels, if cross-polarized (X-pol) antennas are densely arranged (in general, the distance between adjacent antennas is equal to or less than half of a signal wavelength). Exemplary cross-polarized antenna configurations are listed in Table 1 below.

TABLE 1

| 2Tx cross-polarized antenna configuration | 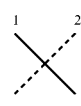 |
| --- | --- |
| 4Tx cross-polarized antenna configuration |  |
| 8Tx cross-polarized antenna configuration | 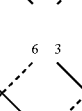 |

In Table 1, the 8Tx cross-polarized antenna configuration groups eight antennas into two groups having different polarizations. The antennas of antenna group 1 (antennas 1, 2, 3 and 4) have the same polarization (e.g. vertical polarization) and the antennas of antenna group 2 (antennas 5, 6, 7 and 8) have the same polarization (e.g. horizontal polarization). The two antenna groups are co-located. For example, antennas 1 and 5 may be co-located, antennas 2 and 6 may be co-located, antennas 3 and 7 may be co-located, and antennas 4 and 8 may be co-located. In other words, the antennas of each antenna group have the same polarization, like a uniform linear array (ULA) and the correlations between antennas in each antenna group have a linear phase increment property. The correlation between antenna groups is characterized by phase rotation.

Since a codebook is quantized values of channels, it is necessary to design a codebook based on real channel characteristics. To verify that real channel characteristics are reflected in the codewords of the codebooks designed as illustrated in Equation 13, a rank-1 codebook will be described as an example. Equation 14 describes a final codeword W determined to be the product of a codeword W1 and a codeword W2, for rank 1.

$$W1(i) * W2(j) = \begin{bmatrix} X_i(k) \\ \alpha_j X_i(k) \end{bmatrix} \quad \text{[Equation 14]}$$

In Equation 14, the final codeword is expressed as an $N_t \times 1$ vector divided into an upper vector $X_i(k)$ and a lower vector $\alpha_j X_i(k)$. The upper vector $X_i(k)$ represents the correlation characteristics of the horizontal polarization antenna group of cross-polarized antennas and the lower vector $\alpha_j X_i(k)$ represents the correlation characteristics of the vertical polarization antenna group of cross-polarized antennas. $X_i(k)$ may be expressed as a vector (e.g. a discrete Fourier transform (DFT) matrix) having the linear phase increment property, reflecting the correlation characteristics between antennas in each antenna group.

Hereinafter, various methods for reporting CSI in a CoMP environment will be explained based on the afore-mentioned description. More specifically, in various CoMP environments such as JT and DCS, a plurality of transmission points participates in transmission and, even in transmission through the same frequency band, channel environments may differ according to from which transmission point transmission is performed. Accordingly, each transmission point may require more accurate CSI. Especially, for frequency selective CSI reporting rather than wideband CSI reporting, CSI reporting on a subband basis may be applied, wherein a subband is a set of a predetermined number of successive RBs divided from an entire system bandwidth. In this case, it is necessary to define which subband is to be selected for each of plural transmission points and how to select a subband for transmission of CSI. While CSI reporting for each transmission point on a subband basis will be described below in detail, CSI reporting of following description will be applied to CoMP which one or more transmission points are controlled by a single transmission point. In addition, the following description will be applied to any one of periodic CSI reporting on a PUCCH and aperiodic CSI reporting on a PUSCH, disclosed in 3GPP TS 36.213.

Embodiment 1

The first embodiment relates to CSI transmission through selection of different subbands for each transmission point in CSI reporting on a subband basis. The first embodiment is desirably applied to DCS. This is because CSI reporting of a UE for any one subband with respect to two or more transmission points may unnecessarily waste resources since only one transmission point participates in transmission with respect to one subband in DCS. However, the first embodiment does not exclude application to JT and may be sufficiently applicable when only one transmission point is involved in one subband in JT.

As a detailed method for selecting different subbands for each transmission point, a UE may select N1 subbands to report CSI for a first transmission point. In addition, the UE may select N2 subbands to report CSI for a second transmission point. N1 may be less than or equal to M which is the total number of subbands and may be greater than or equal to 1. N2 may be less than or equal to M–N1. In this way, the UE may select subbands to report CSI for each transmission point and transmit CSI for the selected subbands for each transmission point.

Thus, when N1 subbands are selected for a first transmission point from among M subbands, a type of a set of the selected subbands may be expressed as $$\binom{M}{N1}. \binom{M}{N1}$$

denotes a combination and a detailed value thereof is $\{M*(M-1)* \ldots *(M-N+1)\}/\{N*(N-1)* \ldots *1\}$. A first selector indicating the N1 selected subbands for the first transmission point may be determined using the number of bits capable of expressing the number of $$\binom{M}{N1}$$

cases. For example, the first selector may be $$\log_2 \binom{M}{N1}$$

bits. N1 subband selection patterns may be matched to cases of binary numbers which can be expressed by $$\log_2 \binom{M}{N1}$$

bits. This will be described in detail with reference to FIGS. 6 and 7.

Figure 6:
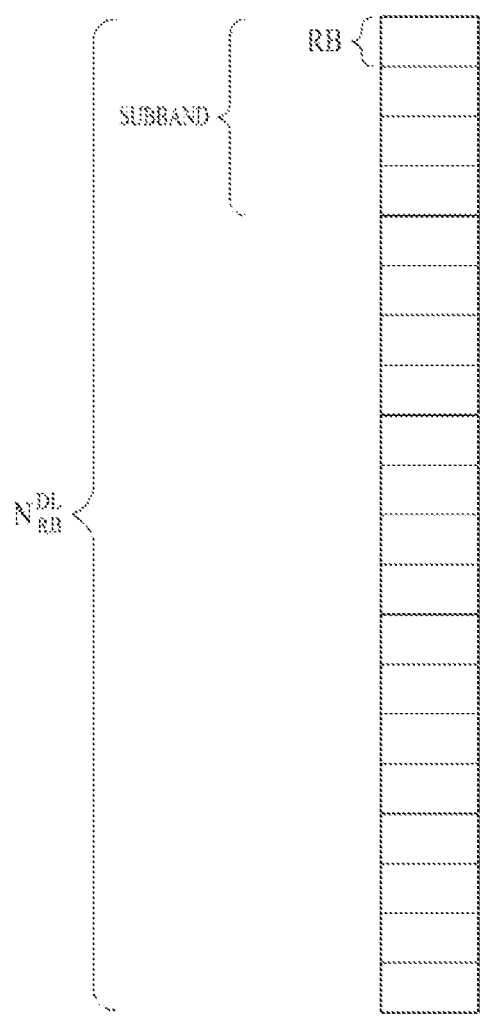
FIG. 6 is a view illustrating the configuration of a subband to which an embodiment of the present invention is applicable.

Referring to FIG. 6, when a system bandwidth, i.e. an entire DL bandwidth $N_{RB}^{DL}$, has 20 RBs and one subband has four consecutive RBs, the total number of subbands is 5 (i.e. M=5). The number of subbands may be determined by upper ($N_{RB}^{DL}$/a factor related to the number of RBs of a subband). Accordingly, when the number of DL RBs is not a multiple of the number of RBs of a subband, one subband may not include RBs of the same number as other subbands. When subbands are configured as illustrated in FIG. 6, selection of two subbands (N=2) for the first transmission point is exemplarily illustrated in FIG. 7. The total number of possible cases capable of selecting the subbands is $$\binom{M}{N1} = \binom{5}{2} = 10.$$

In FIG. 7, (a) to (j) illustrate such cases. The number of such cases can be expressed by $$\log_2\binom{5}{2} = 4 \text{ bits}.$$

For instance, when it is determined that binary numbers 0000, 0001, 0010, . . . , and 1010 indicate subband selection of (a), (b), (c), . . . , (j) of FIG. 7, respectively, it may be appreciated that the UE selects subbands, as illustrated in (a) of FIG. 7, for the first transmission point through the first selector of 0001 and transmits CSI reporting for the first transmission point.

Subsequently, when the UE selects N2 subbands for a second transmission point among (M−N1) subbands except for N1 subbands selected to report CSI for the first transmission point, a type of a set of the selected subbands may be expressed as $$\binom{M-N1}{N2}.$$

As in the above description, a second selector indicating the N2 selected subbands for the second transmission point may be determined using the number of bits capable of expressing the number of $$\binom{M-N1}{N2}$$

cases. The second selector may be $$\log_2\binom{M-N1}{N2}$$

bits. The second selector uses bits fewer in number than the first selector. If N2 is greater than M−N1, this indicates that all subbands except for subbands selected to transmit the CSI for the first transmission point are used to transmit the CSI for the second transmission point. Accordingly, in this case, the second transmission point may estimate that CSI reporting from the UE is about CSI for all subbands except for subbands indicated by the first selector even though the second selector is not present.

The afore-mentioned first selector and second selector may be integrated. Specifically, when N1 subbands for the first transmission point and N2 subbands for the second transmission point are selected from among M subbands, the total number of possible combinations is $$\binom{M}{N1} * \binom{M-N1}{N2}$$

and this may be indicated by a third selector of $$\log_2\left(\binom{M}{N1} * \binom{M-N1}{N2}\right)$$

bits.

While the above embodiment has been described based on two transmission points, it is apparent to those skilled in that art that the above-described embodiment is applicable even when subbands for three or more transmission points are selected and CSI for three or more transmission points is transmitted.

The afore-mentioned selectors indicating subband selection may be configured such that the UE may select subbands of the first transmission point when a k-th bit of an M-bit selector is 0 and select subbands of the second transmission point when the kth bit of the M-bit selector is 1. This is generalized in such that, in a situation in which the UE reports CSI for 2^L transmission points, the UE may transmit an index of a transmission point for each subband in CSI reporting on a subband basis with an (L*M)-bit cell selector.

Embodiment 2

The second embodiment is described on the premise that subbands selected to transmit CSI for each transmission point may overlap. Hereinbelow, the embodiment in DCS and JT will be separately described.

The UE may independently select subbands for each transmission point. In other words, the UE may select subbands 0, 2, and 4 for a first transmission point (eNB1) and select subbands 0, 1, and 5 for a second transmission point (eNB2) as illustrated in (a) of FIG. 8, thereby transmitting CSI for the selected subbands. More specifically, since the UE independently selects subbands in a procedure for reporting CSI for each transmission point, a partial subband (subband 0) for the first transmission point may be identical to that for the second transmission point as illustrated in (a) of FIG. 8. Although not shown in the drawings, all subbands selected for the first transmission point may be equal to those selected for the second transmission point. While the above description is desirably applied to DCS, the invention is not limited to application to JT.

In JT, since the UE simultaneously receives signals from two transmission points, it is desirable to select subbands having better combined channel quality of the two transmission points. In other words, as illustrated in (b) of FIG. 8, subbands are identically selected with respect to the two transmission points (eNB1 and eNB2) and CSI for the selected subbands may be reported. If different subbands are selected for the transmission points even in JT as in (a) of FIG. 8, the case in which any one subband includes only CSI for one transmission point occurs and thus effective JT cannot be performed. If subbands selected for the two transmission points are the same, the UE may report information about subband selection only once, thereby reducing feedback overhead. Alternatively, instead of reporting information about equal subband selection for the transmission points, the UE may use bits used to report information about subband selection for any one transmission point, i.e. a subband selector, for another use. This will now be described in detail.

First, the subband selector may be used to report wideband CSI.

Second, the subband selector may be used to report a CQI appearing when JT or CS/CB is applied. The UE may report, through the subband selector, a CQI calculated under the assumption that the first and second transmission points use a simultaneously reported PMI. In CS/CB, a CQI value, calculated under the assumption that the first transmission point performs transmission using a PMI reported by the UE and the second transmission point creates interference using an arbitrary PMI which is orthogonal to the PMI reported by the UE, may be reported using the subband selector. Through this process, the UE may report a CQI achievable when a CoMP operation is performed using a subband selector of any one transmission point (e.g. the second transmission point) which does not provide meaningful information any more because the same subbands are configured to be selected for the transmission points.

Third, the subband selector may be used to report CSI for the two transmission points. For example, the subband selector may be used to report channel phase and/or amplitude information of the first transmission point and the second transmission point. When CSI for the two transmission points is reported, one port may be selected from among reference signals (RSs) used for channel estimation of each transmission point and phase and/or amplitude information of the two ports may be reported. A network may configure a third RS in addition to the RSs configured to estimate individual channels of the transmission points. Since the third RS needs to report only the phase and/or amplitude information of the two ports, only two transmission antennas may always be configured.

As described earlier, upon configuring CSI reporting for CoMP on a subband basis in order to determine a criterion of subband selection according to a CoMP scheme, namely, DCS or JT, the network may indicate whether subbands per transmission point are identically selected or differently selected through higher-layer signaling (e.g. RRC signaling) or an L1/L2 control signal (e.g. a PDCCH, an e-PDCCH, etc.). More specifically, the network may configure CSI reporting on a subband basis for a plurality of transmission points for a CoMP operation and causes an additional configuration signal to indicate whether subbands selected for CSI reporting are identically selected or independently selected with respect to at least two or more transmission points. Even when the subbands are independently configured, all or some of subbands selected for any two transmission points may be the same according to a channel state of each CSI reporting time. When the subbands are configured to be identically configured with respect to at least two or more transmission points, subband selection for any one transmission point may be set as a criterion so that subband selection for the other transmission point may be identically applied. Further, the above configuration is not necessarily identically applied to all transmission points. In other words, subbands may be configured to be identically selected for some transmission point(s) of a plurality of transmission points and subbands may be configured to be independently selected for the other transmission point(s).

Furthermore, when the UE selects subbands for each transmission point, the network may configure some subbands to be common to transmission points and, in this case, the network may signal the number of commonly selected subbands.

In the above-described embodiments, upon performing CSI reporting for DCS, the UE may select subbands based on the difference in channel quality between the two transmission points. For example, when a signal of the first transmission point is strong and a signal of the second transmission point is weak in any subband, the subband may be very appropriate for data reception from the first transmission point. This is because signal transmission of the second transmission point to another UE in that subband leads to only very small interference when the UE receives a signal from the first transmission point. For such a selection criterion, the network may inform the UE through a higher-layer signal or L1/L2 control signaling that one of assumptions "during signal transmission at one eNB, the other eNB transmits signals for other UEs" and "during signal transmission at one eNB, the other eNB does not transmit signals for other UEs" is applied.

In addition, in the above-described embodiments, the network may additionally configure, when necessary, receiver processing used when the UE calculates PMI/CQI. Receiver processing refers to processes in which the UE including multiple antennas extracts desired signals from reception signals arriving at the antennas thereof. Receiver processing may include receiver beamforming such as zero forcing or minimum mean square error (MMSE) or include successive interference cancellation.

For example, when the eNB requests that the UE should report CSI in consideration of DCS, it is desirable for the UE to select PMI/CQI under the assumption that a signal is transmitted only in a specific transmission point and receiver processing capable of best receiving the signal of the transmission point is performed. More specifically, when PMI/CQI for the first transmission point is calculated, receiver processing for best receiving a signal of the first transmission point is assumed and, when PMI/CQI for the second transmission point is calculated, receiver processing for best receiving a signal of the second transmission point is assumed. Receiver processing processes used for PMI/CQI calculation for the two transmission points may be different (e.g. when MMSE receiver beamforming is used, beamforming matrices used for the two transmission points may be different).

Meanwhile, when JT is mainly performed, since signals transmitted by the two transmission points are combined on a channel and transmitted after a single receiving processing process, it is desirable to assume the same receiver processing when PMI/CQI for each transmission point is calculated. For example, when MMSE receiver beamforming is used, each PMI/CQI is calculated while matrices used for the two transmission points are kept constant. For such an operation, the network may inform, through a higher-layer signal such as RRC or through an L1/L2 control signal, whether the UE assumes the same receiver processing upon calculating PMIs/CQIs for channels of the two transmission points.

Particularly, it may be determined whether receiver processing for the two transmission points is the same together with determination as to whether subbands for the two transmission points are identically selected. If at least one same subband is configured to be selected with respect to the two transmission points, it is assumed that the same receiver processing is used with respect to the two transmission points. Alternatively, the UE assumes the same receiver processing with respect to the two transmission point channels in subbands for reporting PMIs/CQIs for the two transmission points, whereas the UE assumes receiver processing irrespective of PMI/CQI calculation for the other transmission point in a subband reported only for one transmission point.

Meanwhile, in the above-described embodiments, a CQI included in CSI reporting may be any one of a value obtained by quantizing a channel state, an SINR, a carrier-to-interference-and-noise ratio (CINR), a bit error rate (BER), a frame error rate (FER), a value acquired by converting at least one of CQI, SINR, CINR, BER or FER into transmittable data, and a modulation and coding scheme (MCS).

As a criterion for selecting subbands for each transmission point, at least one of best-M and threshold-based schemes may be applied. The best-M scheme serves to select M subbands having the best channel state and the threshold-based scheme serves to select subbands having a channel state higher than a threshold value.

When CSI reporting for selected subbands is transmitted, at least one of an individual transmission scheme and an average transmission scheme may be applied. That is, when the UE selects N1 subbands for the first transmission point from among M subbands, a CQI value for each subband may be transmitted or an average value of CQIs of the N1 selected subbands may be transmitted. The average transmission scheme is advantageous in that signaling overhead does not depend upon the number of selected CQI subbands although a CQI value of each subband is not accurately transmitted in comparison with the individual transmission scheme. An average in the average transmission scheme may be an arithmetic average or an average considering channel capacity.

In the above-described embodiments, when there is a correlation in CSI reporting on a subband basis for transmission points (e.g. when it is specified that the same subbands are selected or different subbands are selected), CSI reporting of the transmission points having correlation is desirably transmitted at the same time (e.g. in the same subframe). This is because, in the case of transmission at different times, incorrect CSI transmission at one transmission time cannot be utilized for CSI reporting at the other transmission time. As a result, channel transmission resources at multiple transmission times may be wasted.

Figure 9:
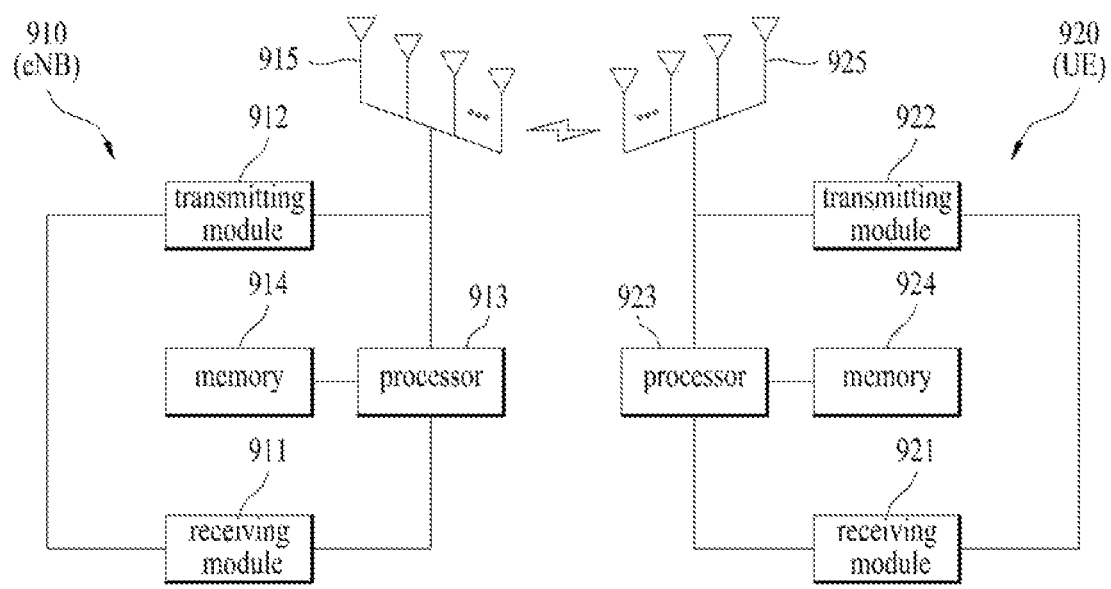
FIG. 9 is a view illustrating the configuration of a transmission apparatus and a reception apparatus according an embodiment of the present invention.

FIG. 9 is a block diagram of a transmission point and a UE according to an embodiment of the present invention.

Referring to FIG. 9, a transmission point 910 according to the present invention may include a reception module 911, a transmission module 912, a processor 913, a memory 914, and a plurality of antennas 915. The transmission point 910 supports MIMO transmission and reception through the plural antennas 915. The reception module 911 may receive signals, data, and information on uplink from the UE. The transmission module 912 may transmit signals, data, and information on DL to the UE. The processor 913 may control overall operation of the transmission point 910.

The processor 913 of the transmission point 910 according to an embodiment of the present invention may be configured to select the above-described subbands for each transmission point, provide configurations necessary to transmit CSI reporting, and receive CSI reporting.

The processor 913 of the transmission point 910 may process information received by the transmission point 910 or information to be transmitted from the transmission point 910. The memory 914 may store processed information for a predetermined time and may be replaced with a component such as a buffer (not shown).

Referring to FIG. 9, a UE 920 may include a reception module 921, a transmission module 922, a processor 923, a memory 924, and a plurality of antennas 925. The UE 920 supports MIMO transmission and reception through the plural antennas 925. The reception module 921 may receive signals, data, and information on downlink from the transmission point. The transmission module 922 may transmit signals, data, and information on UL to the transmission point. The processor 923 may control overall operation of the UE 920.

The processor 923 of the UE 920 according to an embodiment of the present invention may be configured to select the above-described subbands for each transmission point and transmit CSI reporting.

The processor 923 of the UE 920 may process information received by the UE 920 or information to be transmitted from the UE 920. The memory 924 may store processed information for a predetermined time and may be replaced with a component such as a buffer (not shown).

The above transmission point and the UE may be configured to implement the foregoing embodiments independently or implement two or more of the embodiments simultaneously. For clarity, a repeated description will be omitted herein.

The description of the transmission point 910 in FIG. 9 may apply to a relay node as a DL transmission entity or a UL reception entity and the description of the UE 920 in FIG. 9 may apply to the relay node as a DL reception entity or a UL transmission entity.

The above-described embodiments of the present invention may be achieved by various means, for example, hardware, firmware, software, or a combination thereof.

In a hardware configuration, the methods according to the embodiments of the present invention may be achieved by one or more application specific integrated circuits (ASICs), digital signal processors (DSP), digital signal processing devices (DSDPs), programmable logic devices (PLDs), field programmable gate arrays (FPGAs), processors, controllers, microcontrollers, microprocessors, etc.

In a firmware or software configuration, the methods according to the embodiments of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to limit the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The above-described various embodiments of the present invention are applicable to various mobile communication systems.

The invention claimed is:

1. A method for transmitting channel state information to a plurality of transmission points by a user equipment in a wireless communication system, the method comprising:
   receiving a configuration for channel state information reporting; and
   selecting at least one subband to report channel state information for each of a first transmission point and a second transmission point according to the configuration for the channel state information reporting,
   wherein the configuration for the channel state information reporting includes information as to whether a subband for the first transmission point is to be identically selected with a subband for the second transmission point, and
   wherein the subband selected for the first transmission point is excluded from selecting the subband for the second transmission point when the configuration for the channel state information reporting does not indicate that the subband for the first transmission point is to be identically selected with the subband for the second transmission point.

2. The method according to claim 1, wherein the user equipment independently selects subbands for each of the transmission points, except for the case in which the configuration for the channel state information reporting indicates that the subband for the first transmission point is to be identically selected with the subband for the second transmission point.

3. The method according to claim 2, wherein the independently selected subbands overlap.

4. The method according to claim 1, further comprising reporting channel state information of the subband selected for the first transmission point and channel state information of the subband selected for the second transmission point.

5. The method according to claim 1, wherein channel state information of the subband selected for the first transmission point and channel state information of the subband selected for the second transmission point are transmitted in the same subframe.

6. The method according to claim 1, wherein the channel state information includes at least one of channel quality information, a precoding matrix index, and a rank indicator.

7. The method according to claim 1, wherein the configuration for the channel state information reporting is received through radio resource control (RRC) signaling.

8. The method according to claim 1, wherein the configuration for the channel state information is received through first layer (L1)/second layer (L2) control signaling.

9. The method according to claim 1, wherein the transmission points are related to dynamic cell selection or joint transmission.

10. The method according to claim 1, wherein the subband includes a preset number of consecutive resource blocks in a system bandwidth.

11. The method according to claim 1, wherein the channel state information of the subband selected for each transmission point is an average of channel quality information values for the selected subband.

12. The method according to claim 1, wherein the channel state information is transmitted on at least one of a physical uplink control channel and physical uplink shared channel.

13. A user equipment for transmitting channel state information to a plurality of transmission points in a wireless communication system, the user equipment comprising:
   a transmission module; and
   a processor,
   wherein the processor is configured to receive a configuration for channel state information reporting and select at least one subband to report channel state information for each of a first transmission point and a second transmission point according to the configuration for the channel state information reporting,
   wherein the configuration for the channel state information reporting includes information as to whether a subband for the first transmission point is to be identically selected with a subband for the second transmission point, and
   wherein the subband selected for the first transmission point is excluded from selecting the subband for the second transmission point when the configuration for the channel state information reporting does not indicate that the subband for the first transmission point is to be identically selected with the subband for the second transmission point.

* * * * *